US008262233B2

(12) United States Patent
Mochizuki

(10) Patent No.: US 8,262,233 B2
(45) Date of Patent: Sep. 11, 2012

(54) LIGHT CONTROL DEVICE AND ILLUMINATION DEVICE FOR A PROJECTOR INCLUDING SAME

(75) Inventor: Hirotaka Mochizuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 291 days.

(21) Appl. No.: 12/724,593

(22) Filed: Mar. 16, 2010

(65) Prior Publication Data

US 2010/0238419 A1 Sep. 23, 2010

(30) Foreign Application Priority Data

Mar. 18, 2009 (JP) ................................ 2009-065729

(51) Int. Cl.
*G03B 21/14* (2006.01)

(52) U.S. Cl. ........................................... 353/97; 353/98

(58) Field of Classification Search .............. 353/89–97; 362/268; 359/235
See application file for complete search history.

(56) References Cited

U.S. PATENT DOCUMENTS

| | | | | |
|---|---|---|---|---|
| 6,854,851 | B2 * | 2/2005 | Yamasaki et al. | 353/97 |
| 7,344,255 | B2 | 3/2008 | Hara et al. | |
| 2008/0304022 | A1 | 12/2008 | Yamada et al. | |

FOREIGN PATENT DOCUMENTS

| | | | |
|---|---|---|---|
| JP | 2004-069966 | A | 3/2004 |
| JP | 2005-017501 | A | 1/2005 |
| JP | 2005-168601 | * | 8/2005 |
| JP | 2005-292532 | A | 10/2005 |
| JP | 2006-208568 | A | 8/2006 |
| JP | 2006-308787 | A | 11/2006 |
| JP | 2007-093741 | A | 4/2007 |
| JP | 2009-015295 | A | 1/2009 |

OTHER PUBLICATIONS

Translation of Usuda Yuichiro, Japanese reference 2005-168601.*

* cited by examiner

*Primary Examiner* — Que T Le
*Assistant Examiner* — Jerry Brooks
(74) *Attorney, Agent, or Firm* — AdvantEdge Law Group, LLC

(57) ABSTRACT

In at least one embodiment of the disclosure, a light control device includes a light blocking module to block a luminous flux passing through the light control device in a direction parallel to a system optical axis. The light blocking module includes a first and a second light blocking member. The first light blocking member includes a cutout portion at an end near a system optical axis, the first light blocking member configured so as to change a size of an area blocking the luminous flux in accordance with an opening and closing operation of the light blocking module. The second light blocking member is disposed in proximity to the first light blocking member and configured so as to increasingly block the luminous flux from passing through the cutout portion of the first light blocking member in accordance with the closing operation of the light blocking module.

16 Claims, 9 Drawing Sheets

LIGHT CONTROL DEVICE AND ILLUMINATION DEVICE FOR A PROJECTOR INCLUDING SAME

CROSS-REFERENCE

The present application claims priority from Japanese Patent Application No. 2009-065729 filed on Mar. 18, 2009 which is hereby incorporated by reference in its entirety.

BACKGROUND

A technology is known in the industry which carries out an adjustment of an amount of illumination light by disposing a light control device which includes a turnable light blocking member between a pair of lens arrays (fly-eye lenses) installed inside an illumination device of an image display apparatus such as a projector (see, for example, JP-A-2004-69966). In particular, as this kind of light control device, one is known which uses a pair of opening and closing light blocking bodies which have a shape wherein they are bent like a letter V, and each of which has, for example, a bow-shaped cutout in a leading edge portion (see, for example, JP-A-2009-15295). Also known in the industry are a technology which provides a cutout in an end portion of a block-like light blocking body, and adjusts the amount of blocked light comparatively gently (see, for example, JP-A-2005-17501), and a technology including a diaphragm method which operates four light blocking plates to move in synchronization from four corners so that they come into proximity with, or move away from, each other (see, for example, JP-A-2007-93741).

However, in the case of providing a cutout in the light blocking bodies as in, for example, JP-A-2009-15295, although it is possible to change the amount of blocked light comparatively gently, there is a possibility that at a time of a maximum light blocking rate, that is, when the light blocking bodies are fully closed, light will leak from the cutouts, and the amount of illumination light cannot be sufficiently lowered. In the case of using a block-like light blocking body which has a cutout as the light blocking member, as in JP-A-2005-17501, there is a possibility that it is necessary to form a complex curved surface in an end portion of the light blocking body in order to make the desired change in the amount of blocked light. In this case, a space for the light blocking body is also necessary, but it may be the case that there is a spatial restriction around the pair of lens arrays, and it is difficult to install the block-like light blocking body. Also, in order to operate the four light blocking plates to move in synchronization so that they come into proximity with each other, as in JP-A-2007-93741, it is necessary to provide a complex mechanism.

SUMMARY

Various embodiments of the disclosure provide a light control device, and a projector-use illumination device using such a light control device, which can sufficiently lower the amount of illumination light at the time of the maximum light blocking rate, with a simple structure, while making the change in the amount of blocked light comparatively gentle.

A light control device according to one aspect of the disclosure includes a light blocking module including turning axis modules for an opening and closing operation, and a turning mechanism which causes the turning axis modules to turn, wherein the light blocking module includes first light blocking members and second light blocking members, the first light blocking members, being configured of plate-like members, include cutout portions in end portions on a system optical axis side, and change the size of an area blocking light from passing through in accordance with the opening and closing operation of the light blocking module, and the second light blocking members, being disposed in proximity to the first light blocking members, change an area blocking off light corresponding to the cutout portions in accordance with the opening and closing operation of the light blocking module, and block at least one portion of a luminous flux from passing through the cutout portions when the first light blocking members are fully closed.

As such, with the first light blocking members including the cutout portions, it is possible to make the change in the amount of blocked light comparatively gentle, and also, by the second light blocking members changing the area blocking off light corresponding to the cutout portions, and blocking off all, or one portion of, the luminous flux corresponding to the cutout portions when the first light blocking members are fully closed, it is possible to sufficiently lower the amount of illumination light passing through the light control device at the time of the maximum light blocking rate.

Also, according to at least one embodiment, the second light blocking members, not being involved in the area blocking the luminous flux from passing through the cutout portions when the first light blocking members are fully open during the opening and closing operation of the light blocking module, maximize the area blocking the luminous flux from passing through the cutout portions when the first light blocking members are fully closed. As such, the second light blocking members, not being involved in blocking off the luminous flux, can maintain the amount of illumination light when the first light blocking members are fully open, and can lower the amount of illumination light by maximizing the amount of luminous flux blocked off when the first light blocking members are fully closed.

Also, according to at least one embodiment, the second light blocking members are attached integrally to the first light blocking members. As such, the second light blocking members turn together with the first light blocking members, and the structure may be simplified.

Also, according to at least one embodiment, the second light blocking members, being configured of plate-like members, form end portions corresponding to the cutout portions of the first light blocking members by one portion of the plate-like members being bent back. As such, it is possible to achieve a three-dimensional disposition with a comparatively simple, space-saving structure wherein the plate-like second light blocking members are combined with the first light blocking members, which include the cutout portions, to carry out a blocking off operation close to that of a block-like light blocking body.

Also, according to at least one embodiment, the end portions of the first light blocking members, including the cutout portions, and the end portions of the second light blocking members, having edges, gradually move away from the turning axis toward the edge sides at a predetermined angle. As such, by fixing the predetermined angle, it is possible to adjust degrees of a first stage of light blocking by only the first light-blocking members, and a second stage of light blocking in which the effect of the blocking off of the luminous flux by the second light-blocking members is added.

Also, according to at least one embodiment, the edges of the second light blocking members are parallel to the edges of the first light blocking members. As such, with regard to the blocking of light by the second light-blocking members, it is possible to keep an illuminance distribution of the emitted luminous flux uniform, and carry out a light reduction with the edges.

Also, according to at least one embodiment, the first light blocking members to which the second light blocking members are attached are symmetrically disposed as a pair with the system optical axis as a central axis, and the turning mechanism drives the pair of first light blocking members in synchronization. As such, it is possible to carry out the blocking off of light in a condition in which the symmetry of the light control device is maintained.

A projector-use illumination device according to at least one embodiment includes the heretofore described light control device, and a pair of fly-eye lenses for homogenizing light source light from a light source, forming an illumination light, wherein the light control device is disposed between the pair of fly-eye lenses.

As such, the change in the amount of blocked light is comparatively gentle, and also, it is possible to form an illumination light in which the amount of illumination light is sufficiently lowered at the time of the maximum light blocking rate. By using the illumination device in a projector, an image formation with an increased dynamic contrast is possible and it is also possible to make a light reduction curve of a gentle condition.

BRIEF DESCRIPTION OF THE DRAWINGS

Non-limiting and non-exhaustive embodiments of the present disclosure will be described with reference to the accompanying drawings, wherein like numbers reference like elements.

DESCRIPTION OF EMBODIMENTS

In the following description, reference is made to the accompanying drawings which form a part hereof, and in which are shown, by way of illustration, specific embodiments in which the disclosure may be practiced. It is to be understood that other embodiments may be utilized and changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

First Embodiment

Hereafter, referring to FIG. 1, a description will be given of a projector in which is installed a light control device according to a first embodiment of the disclosure.

1. Outline of Projector Structure

Figure 1:
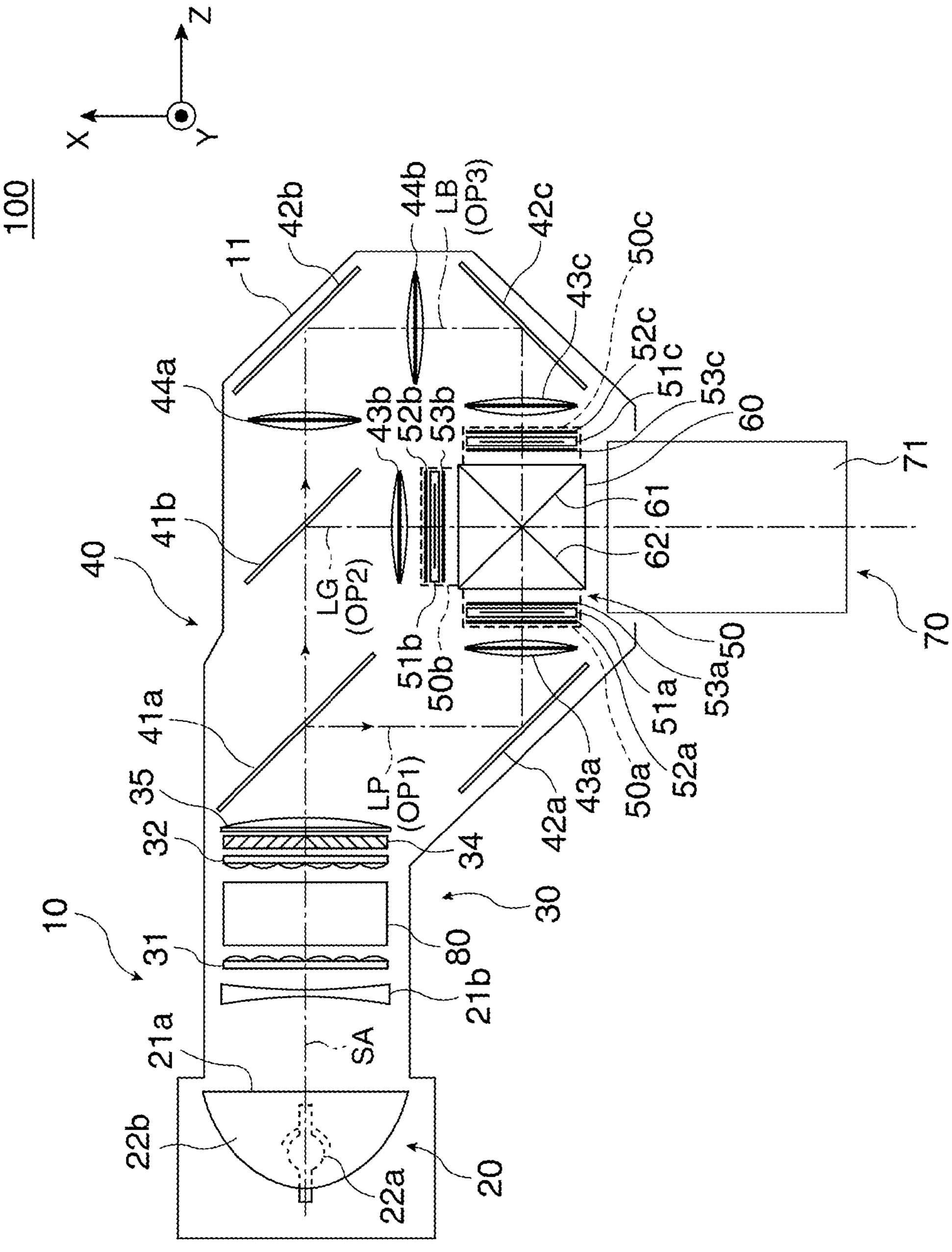
FIG. 1 is a plan view conceptually showing a projector according to a first embodiment.

As shown in FIG. 1, a projector 100 according to the embodiment includes, as optical components, an illumination device 10, a color separation/light guiding optical system 40, a light modulating module 50, a cross dichroic prism 60, and a projection optical system 70, of which the illumination device 10 includes a light source lamp unit 20, an homogenizing optical system 30, and a light control device 80.

These optical components, that is, the illumination device 10, color separation/light guiding optical system 40, light modulating module 50, cross dichroic prism 60, and projection optical system 70, are approximately wholly housed in a case member 11, which is a light guide with a light blocking property. Also, the optical components are fitted into a protective portion (not shown) provided on the inner surface, and the like, of the case member 11.

Within the illumination device 10, the light source lamp unit 20 includes, as a light source module, a lamp module 21*a* and a concave lens 21*b*. Of these, the lamp module 21*a* includes a lamp main body 22*a* which is, for example, a high pressure mercury-vapor lamp, and a concave mirror 22*b*, which reflects and emits forward a light source light. The concave lens 21*b* has a role of forming the light source light from the lamp module 21*a* into a luminous flux approximately parallel to a system optical axis SA, that is, to an illumination optical axis, but can be omitted in the event that, for example, the concave mirror 22*b* is a parabolic mirror.

The homogenizing optical system 30 includes first and second lens arrays 31 and 32, a polarization converting member 34, and a superimposing lens 35. The first and second lens arrays 31 and 32 are fly-eye lenses, each configured of a plurality of element lenses disposed in a matrix form. Of these, the luminous flux emitted from the light source lamp unit 20 is divided into a plurality of partial luminous fluxes by the element lenses configuring the first lens array 31. Also, each partial luminous flux from the first lens array 31 is emitted at an appropriate angle of divergence by the element lenses configuring the second lens array 32. The polarization converting member 34, being configured of a PBS prism array, or the like, converts the light source light emitted from the lens array 32 into only linearly-polarized light of a specific direction, and supplies it to a next-stage optical system. The superimposing lens 35, by appropriately causing the illumination light, emitted from the second lens array 32 and passing through the polarization converting member 34, to converge as a whole, enables a superimposed illumination of various colored liquid crystal light bulbs 50*a*, 50*b*, and 50*c* provided in the light modulating module 50.

The light control device 80, being disposed between the first lens array 31 and second lens array 32, adjusts an amount of illumination light in the illumination light emitted from the illumination device 10 by a pair of light blocking members, to be described hereafter, opening and closing like double doors. A description will be given hereafter of a specific configuration of the light control device 80.

The color separation/light guiding optical system 40 includes first and second dichroic mirrors 41*a* and 41*b*, reflecting mirrors 42*a*, 42*b*, and 42*c*, and three field lenses 43*a*, 43*b*, and 43*c* and, as well as separating the illumination light emitted from the light source lamp unit 20 into three colors, red (R), green (G), and blue (B), guides each colored light to the liquid crystal light bulbs 50*a*, 50*b*, and 50*c* of the subsequent stage. To describe in more detail, firstly, the first dichroic mirror 41*a* reflects an illumination light LR of the R color, of the three colors RGB, and transmits illumination lights LG and LB of the G color and B color. Also, the second dichroic mirror 41*b* reflects the illumination light LG of the G color, of the two colors GB, and transmits the illumination light LB of the B color. That is, the red colored light LR reflected by the first dichroic mirror 41*a* is guided to a first optical path OP1, in which is the field lens 43*a*, the green colored light LG transmitted through the first dichroic mirror 41*a* and reflected by the second dichroic mirror 41*b* is guided to a second optical path OP2, in which is the field lens 43*b*, and the blue colored light LB transmitted through the second dichroic mirror 41*b* is guided to a third optical path OP3, in which is the field lens 43*c*. The field lenses 43*a*, 43*b*, and 43*c* for each color adjust an angle of incidence so that each partial luminous flux emitted from the second lens array 32 and falling incident on the light modulating module 50 is of an appropriate degree of convergence, or degree of divergence, with respect to the system optical axis SA in an irradiated area of each of the liquid crystal light bulbs 50*a*, 50*b*, and 50*c*. A pair of relay lenses 44*a* and 44*b*, being disposed in the third optical path OP3 which is relatively long in comparison with the first optical path OP1 and second optical path OP2, prevent a drop in a use efficiency of the light due to light diffusion, or the like, by transmitting an image formed immediately before the first relay lens 44*a* on the incidence side almost unchanged to the field lens 43*c* on the emission side.

The light modulating module 50 includes the three liquid crystal light bulbs 50*a*, 50*b*, and 50*c*, on which the three colors of illumination light LR, LG, and LB respectively fall incident. Each of the liquid crystal light bulbs 50*a*, 50*b*, and 50*c* includes, respectively, liquid crystal panels 51*a*, 51*b*, and 51*c*, disposed in the center, and pairs of incidence side polarization filters 52*a*, 52*b*, and 52*c* and emission side polarization filters 53*a*, 53*b*, and 53*c*, disposed so as to sandwich them. Each of the colored lights LR, LG, and LB falling incident on, respectively, the liquid crystal light bulbs 50*a*, 50*b*, and 50*c* is intensity modulated in pixel units in accordance with a drive signal, or control signal, input into each of the liquid crystal light bulbs 50*a*, 50*b*, and 50*c* as an electrical signal.

The cross dichroic prism 60 being a light synthesizing optical system for synthesizing a color image, an R light reflecting first dichroic film 61 and a B light reflecting second dichroic film 62 are disposed in an X shape in a plan view in its interior. The cross dichroic prism 60 reflects the red colored light LR from the liquid crystal light bulb 50*a* with the first dichroic film 61, emitting it to the right side of the direction of travel, emits the green colored light LG from the liquid crystal light bulb 50*b* in a straight line via the two dichroic films 61 and 62, and reflects the blue colored light LB from the liquid crystal light bulb 50*c* with the second dichroic film 62, emitting it to the left side of the direction of travel.

The projection optical system 70, as a projection lens, projects an image light synthesized by the cross dichroic prism 60 onto a screen (not shown) as a color image.

In the projector 100 with the heretofore described configuration, the illumination device 10, by having the light control device 80 built in, carries out an adjustment of the amount of illumination light by partially blocking off the light. That is, the projector 100, being able to make the amount of illumination light variable with the light control device 80, can obtain, for example, a high dynamic contrast. Also, the projector 100, using a light control device 80 with a gentle light reduction curve, can form a high-quality image by means of a highly-responsive dimming.

2. Description of Light Control Device Structure

Figure 2:
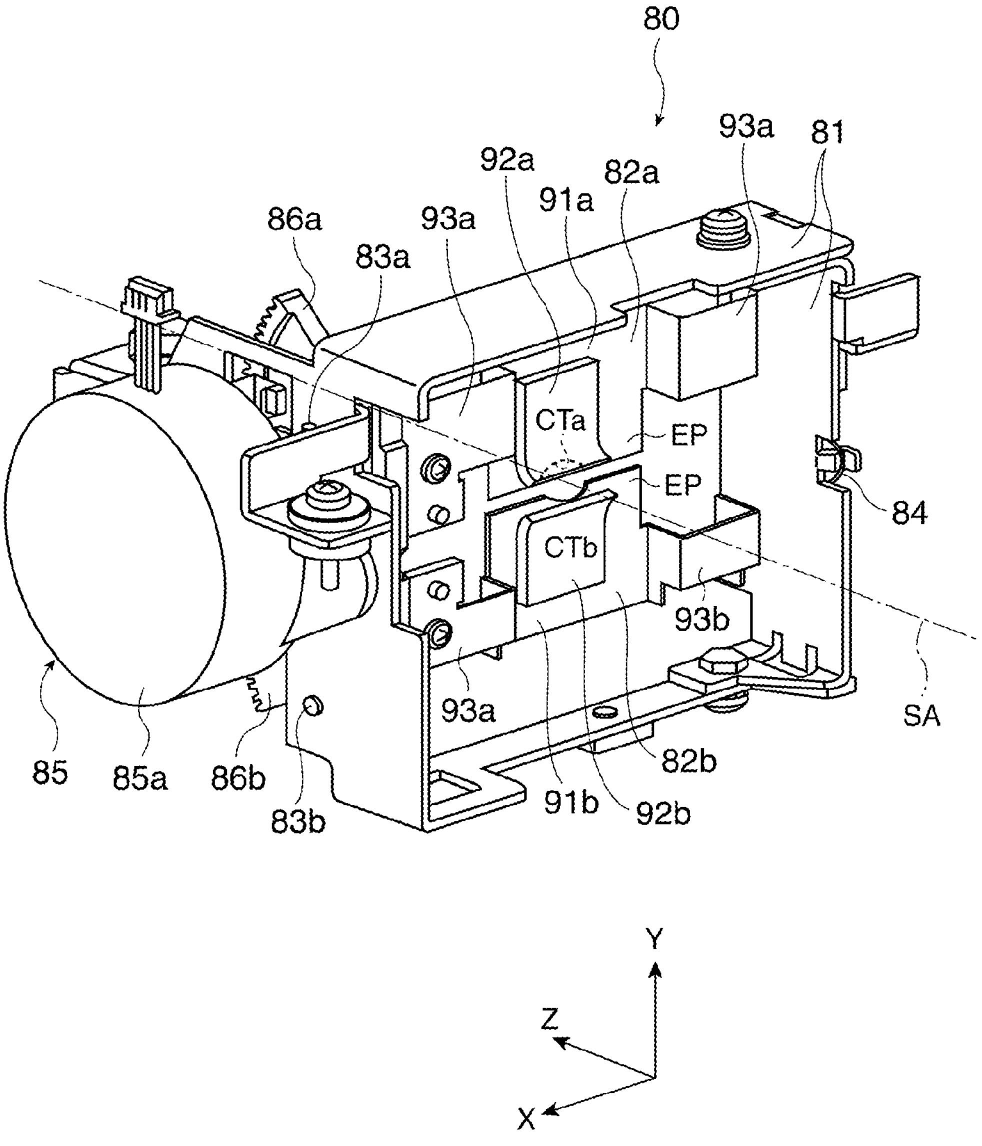
FIG. 2 is a perspective view from one direction showing a structure of a light control device.
Figure 3:
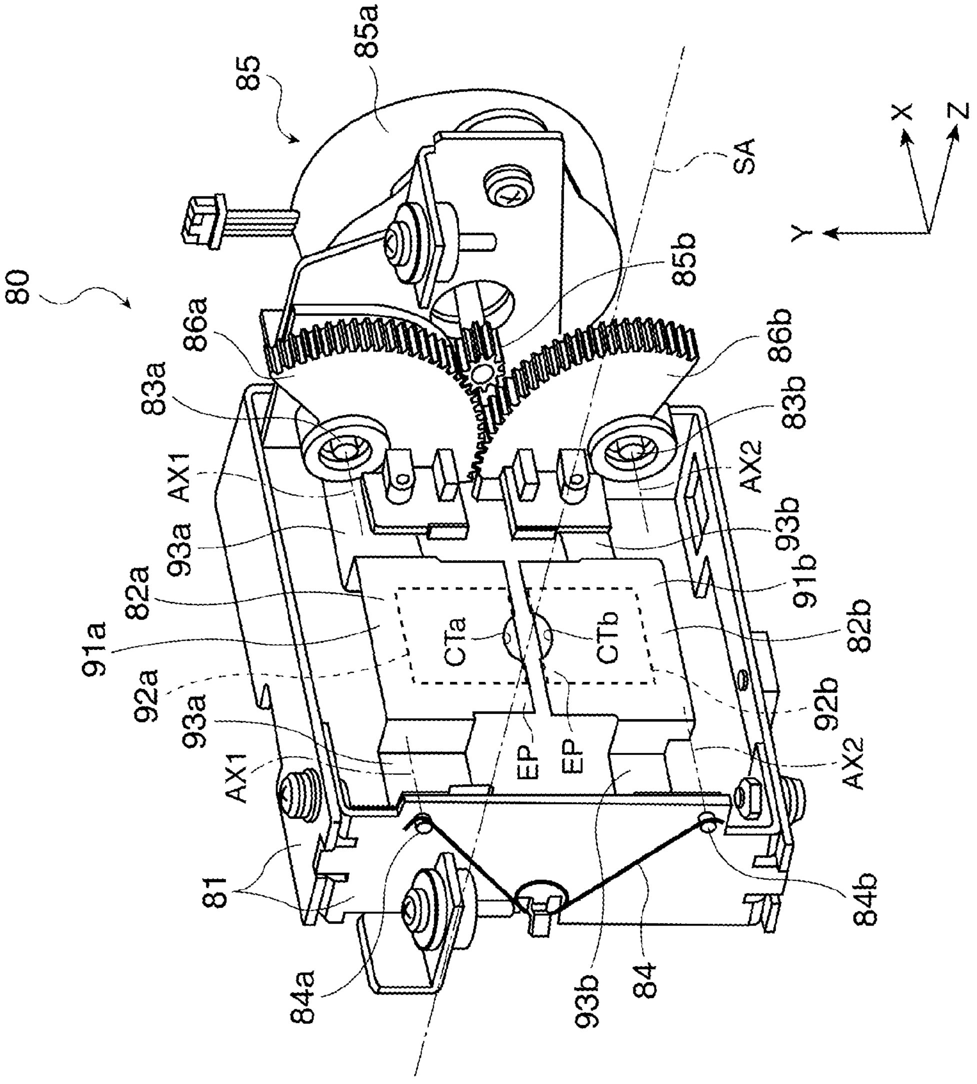
FIG. 3 is a perspective view from another direction showing the structure of the light control device.

FIGS. 2 and 3 being perspective views illustrating a structure of the light control device 80, FIG. 2 shows a condition of the light control device 80 seen from an optical path upstream side, while FIG. 3 shows a condition of the light control device 80 seen from an optical path downstream side. The light control device 80 includes fixing members 81, a pair of light blocking modules 82*a* and 82*b*, a biasing member 84, and a turning mechanism 85. In particular, the pair of light blocking modules 82*a* and 82*b*, being configured of a pair of plate-like first light-blocking members 91*a* and 91*b*, a pair of plate-like second light-blocking members 92*a* and 92*b* fixed in an integrated condition on the first light-blocking members 91*a* and 91*b*, and turning axis modules (pin-shaped turning pins) 83*a*, 83*b*, 84*a*, and 84*b* for receiving an action of the turning mechanism 85, adjust the amount of illumination light emitted from the illumination device 10 by blocking off one portion of the illumination light by means of an opening and closing operation.

Herein, in the light blocking modules 82*a* and 82*b*, cutout portions CTa and CTb are formed respectively in, of end portions of the first light-blocking members 91*a* and 91*b*, end portions EP positioned on the sides which separate farthest from turning axes AX1 and AX2. As the cutout portions CTa and CTb are formed in the end portions EP, they move over a wide range during the opening and closing operation. Also, the second light-blocking members 92*a* and 92*b* are formed in such a way as to partially cover the cutout portions CTa and CTb from the optical path upstream side in a light blocking condition shown in FIG. 2. Because of this, an amount of the illumination light blocked off in the light blocking condition of the light control device 80 is increased.

Figure 4:
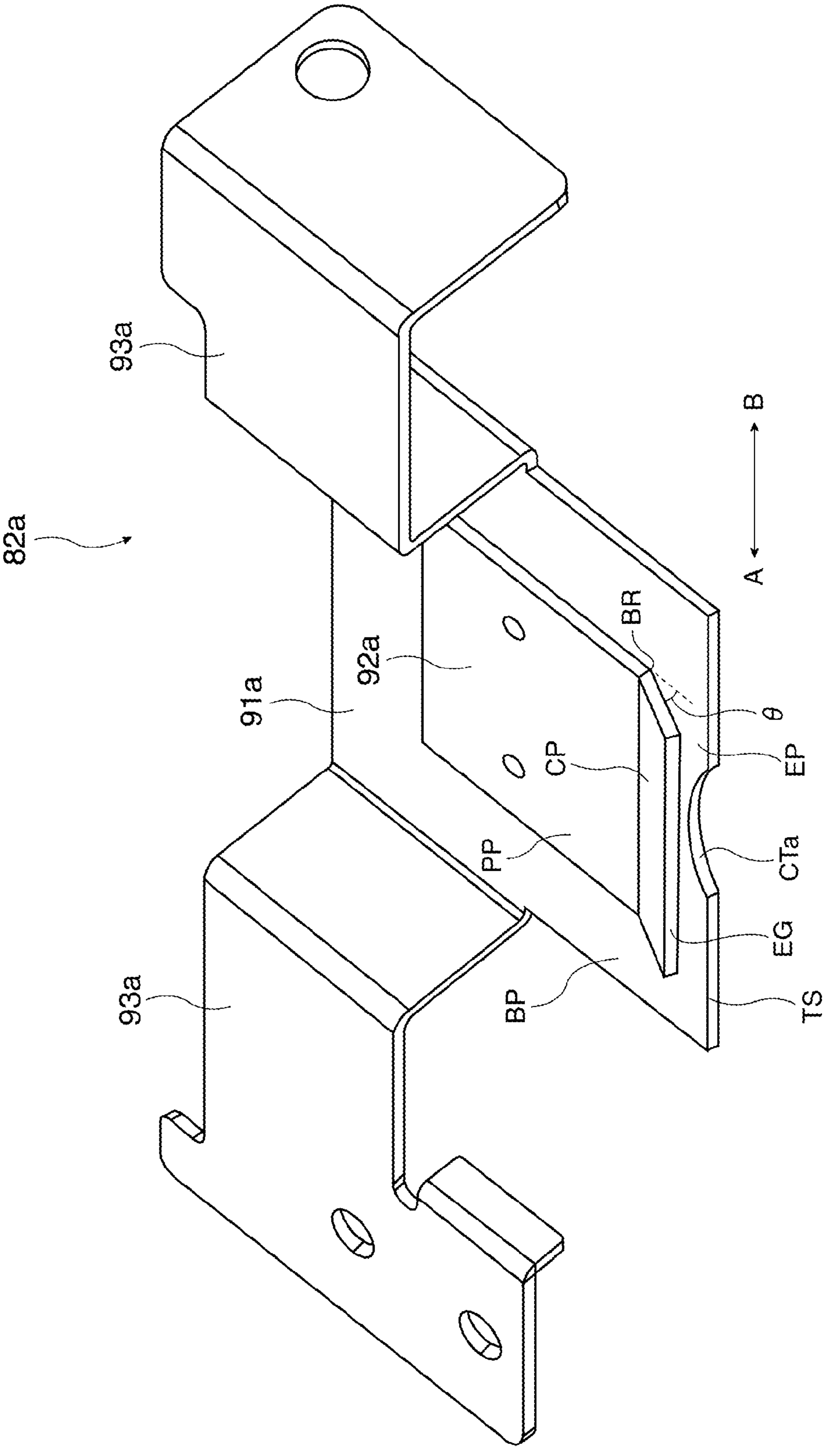
FIG. 4 is a perspective view showing a structure of light blocking members.

FIG. 4 is a perspective view of an enlargement of the first light-blocking member 91*a* and second light-blocking member 92*a* of the light blocking module 82*a*, one of the pair of light blocking modules 82*a* and 82*b* shown in FIG. 2. As the other of the pair, the light blocking module 82*b*, has the same structure as the light blocking module 82*a*, it is omitted from the drawing.

Within the light blocking module 82*a*, the first light-blocking member 91*a* has a rectangular, flat, plate-like portion BP in a central portion, which is a principal portion in the blocking of light, and attachment portions 93*a* and 93*a*, extending from either end of the plate-like portion BP, for fitting the first light-blocking member 91*a* inside the light control device 80. The cutout portion CTa formed by cutting away an edge TS of the end portion EP of the plate-like portion BP has, as shown in the drawing, a horizontally long arc-like curved shape extending in a direction of extension of the edge TS (the AB direction in the drawing). Because of this shape, it is possible to keep an illuminance distribution of the emitted luminous flux uniform, and also carry out a gentle light reduction. Meanwhile, the second light-blocking member 92*a* has a rectangular, flat plate portion PP, and an end portion CP, which is a leading edge portion formed in such a way as to extend bent back from the flat plate portion PP. As the flat plate portion PP is affixed onto the plate-like portion BP of the first light-blocking member 91*a* with sheet-metal, or the like, the second light-blocking member 92*a* is in a condition in which it is integrated with the first light-blocking member 91*a*. A border BR between the end portion CP and flat plate portion PP being in a position adjacent to the cutout portion CTa, the end portion CP tilts at an angle θ with respect to the plate-like portion BP, and extends in such a way as to gradually separate from the end portion EP, including the cutout portion CTa. Because of this, it is possible to partially cover the cutout portion CTa from the optical path upstream side, and block off at least one portion of the illumination light, in the light blocking condition shown in, for example, FIG. 2. An edge EG of the end portion CP extends linearly, parallel to the direction of extension of the edge TS (the AB direction).

Herein, as shown in FIG. 2, the first light-blocking member 91*b* and second light-blocking member 92*b* of the other of the pair, the light blocking module 82*b*, also have the same configuration as the heretofore described first light-blocking member 91*a* and second light-blocking member 92*a*. That is, for example, the first light-blocking member 91*b* is fitted inside the light control device 80 via attachment portions 93*b* and 93*b*.

Returning to FIGS. 2 and 3, additional description will be given of the light control device 80. The fixing members 81, being fitted to the case member 11, which is a light guide, support the turning pins 83*a*, 83*b*, 84*a*, and 84*b*, and the turning mechanism 85. The pair of light blocking modules 82*a* and 82*b* extend in a horizontal direction (X direction) perpendicular to the system optical axis SA, individually supported by the pair of turning pins 83*a* and 83*b*, and the pair of turning pins 84*a* and 84*b*, via the attachment portions 93*a* and 93*b* of the first light-blocking members 91*a* and 91*b*, and, as well as opposing each other across the system optical axis SA, are disposed symmetrically about the system optical axis SA. The biasing member 84 being such that a pair of end portions of a coil spring are extended so as to form a V shape in a plan view, leading edge portions of each end portion are put into a condition in which they are fitted into grooves formed in leading edges of the pin-shaped turning pins 84*a* and 84*b*, preventing the turning pins 84*a* and 84*b* from falling out. The biasing member 84, by causing a biasing force to work toward the outer side of the V shape, causes the light blocking modules 82*a* and 82*b* to pivot on the turning pins 84*a* and 84*b*. Also, the light blocking modules 82*a* and 82*b* are fixed in a turnable condition on the turning mechanism 85 side by the pin-shaped turning pins 83*a* and 83*b*. Because of the above, the pair of light blocking modules 82*a* and 82*b* can turn about the turning axes AX1 and AX2 respectively. The turning mechanism 85 includes a motor 85*a*, a transmission module 85*b*, and a pair of drive gears 86*a* and 86*b*. The rotation of the motor 85*a* is transmitted to the pair of drive gears 86*a* and 86*b* via the transmission module 85*b*. At this time, as the upper side drive gear 86*a* and lower side drive gear 86*b* rotate in synchronization in opposite directions, the light blocking modules 82*a* and 82*b* fixed to the pair of drive gears 86*a* and 86*b* also rotate in synchronization. However, the light blocking modules 82*a* and 82*b*, being attached in positions away from the turning axes AX1 and AX2 respectively, assume an operating condition, that is, the light blocking condition (shown in the drawings), in which they approach each other in the system optical axis SA direction, and a withdrawn condition, that is, a non-light blocking condition (not shown), in which they both move away from the system optical axis SA, accompanying a positive rotation or negative rotation of the motor 85*a*.

In this way, in the embodiment, as the second light-blocking members 92*a* and 92*b* have the heretofore described kind of shape, in at least the kind of light blocking condition shown in FIGS. 2 and 3, of the opened and closed conditions of the light blocking modules 82*a* and 82*b*, one portion of the illumination light falling incident from the optical path upstream side direction of the system optical axis SA is blocked off. That is, the light is blocked off not only by the first light-blocking members 91*a* and 91*b*, but also by the second light-blocking members 92*a* and 92*b*, because of which, it is possible to sufficiently lower the amount of illumination light when the light blocking modules 82*a* and 82*b* are fully closed.

3. Adjustment of Light Blocking Area by Light Control Device

Figure 5:
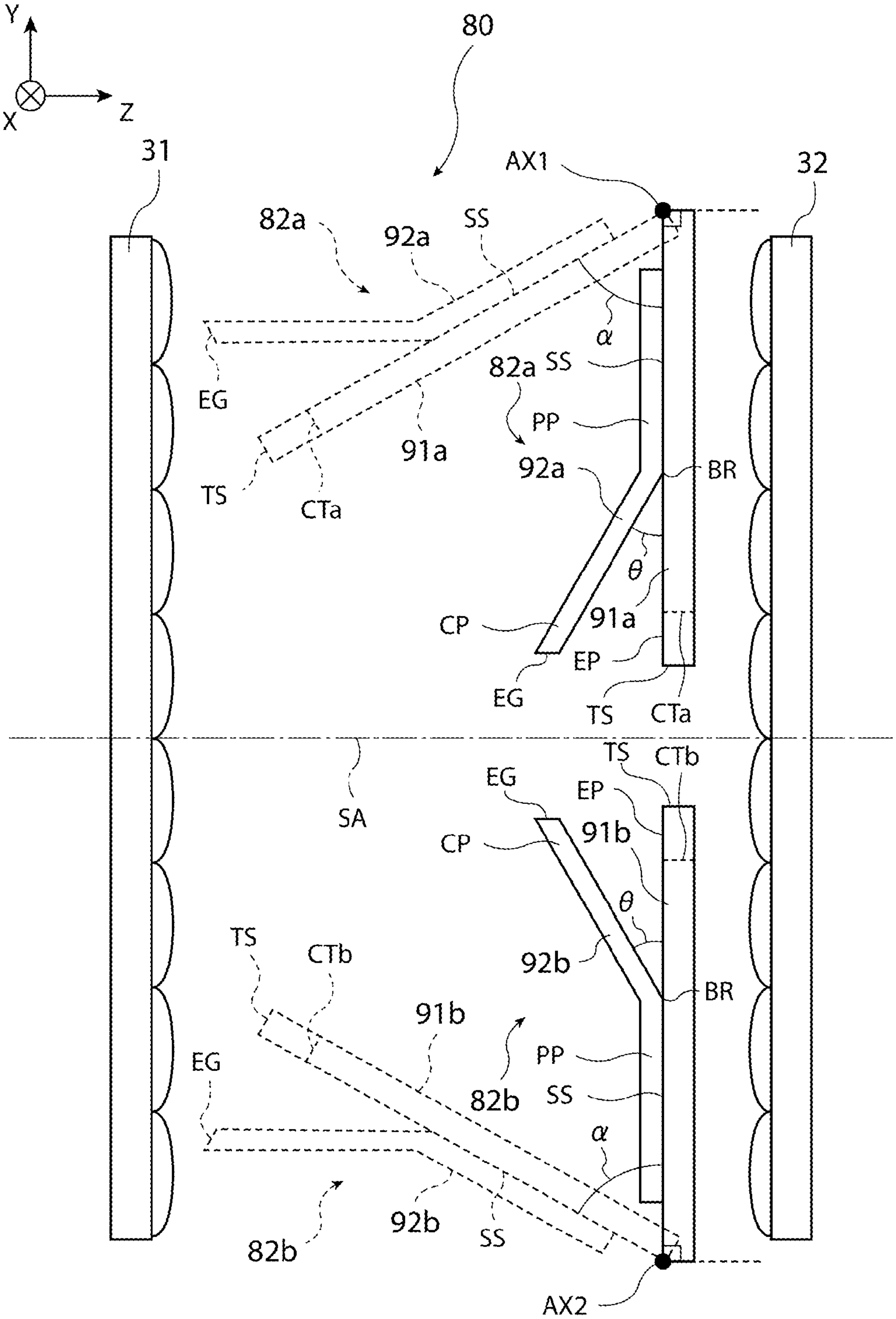
FIG. 5 is a diagram showing an opening and closing operation of the light control device inside the projector.

FIG. 5 is a conceptual diagram, showing one portion of FIG. 1 enlarged in order to give a detailed description of a changing of the amount of illumination light with the operation of the light control device 80. In FIG. 5, the first light-blocking members 91*a* and 91*b* (only the principal portions) and second light-blocking members 92*a* and 92*b*, within the pair of light blocking modules 82*a* and 82*b*, which are directly involved in the adjustment of the amount of blocked light, are shown schematically as the light control device 80. Also, herein, the first light-blocking members 91*a* and 91*b* turn with the turning axes AX1 and AX2 as axes, and side surfaces SS as references.

The first light-blocking members 91*a* and 91*b*, due to a turning operation with the turning axes AX1 and AX2 as axes, assume a fully closed condition, in which they are in a condition approximately parallel to the second lens array 32, as shown by the solid lines in the drawing, and a condition in which, for example, they are opened by a turning angle α in comparison with when fully closed, as shown by the broken lines in the drawing. By this means, an adjustment of the amount of blocking of the illumination light is carried out by the light blocking modules 82*a* and 82*b*. As already described, in the first light-blocking members 91*a* and 91*b*, the cutout portions CTa and CTb are formed in the end portions EP positioned on the sides farther from the turning axes AX1 and AX2. The cutout portions CTa and CTb can swing along with the turning operation of the first light-blocking members 91*a* and 91*b*. The cutout portions CTa and CTb exist in positions farther from the system optical axis SA than the edges TS. Also, the second light-blocking members 92*a* and 92*b*, both being integrated with the first light-blocking members 91*a* and 91*b*, can swing together with the first light-blocking members 91*a* and 91*b*.

With the heretofore described kind of opening and closing operation, the pair of light blocking modules 82*a* and 82*b* enable the amount of blocking of the light emitted from the first lens array 31 to be adjusted. At this time, the second light-blocking members 92*a* and 92*b*, on the turning angle α of the first light-blocking members 91*a* and 91*b* becoming a certain constant value or lower, partially cover the areas of luminous flux corresponding to the cutout portions CTa and CTb from the optical path upstream side. That is, elements of the illumination light which would pass through the cutout portions CTa and CTb supposing that the second light-blocking members 92*a* and 92*b* did not exist are partially blocked by the end portions CP of the second light-blocking members 92*a* and 92*b*. Because of this, the amount of blocking of the light by the light blocking modules 82*a* and 82*b* is further increased.

Figure 6B:
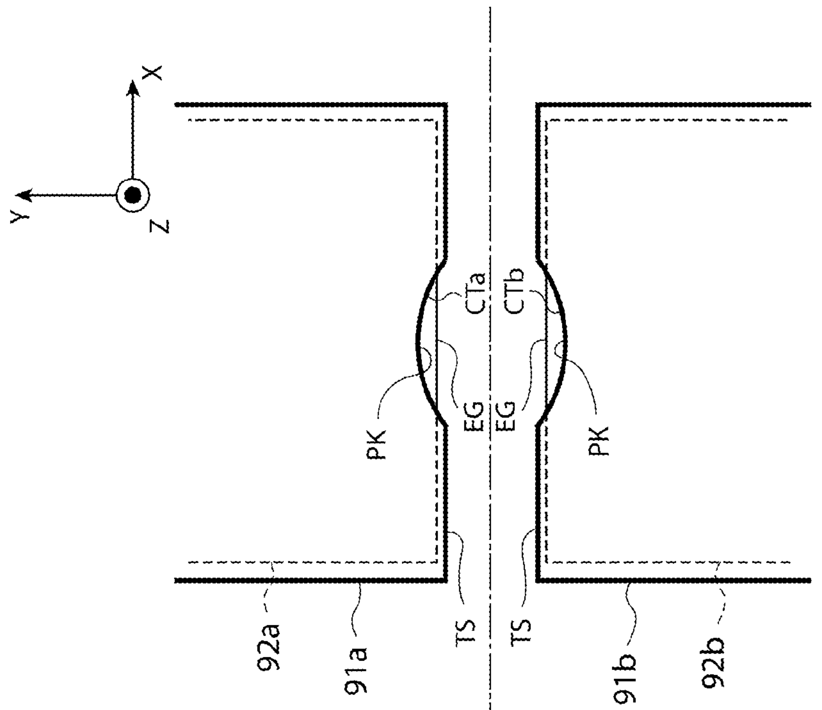
FIGS. 6A and 6B are diagrams showing conditions of the light blocking members during the opening and closing operation of the light control device.
Figure 6A:
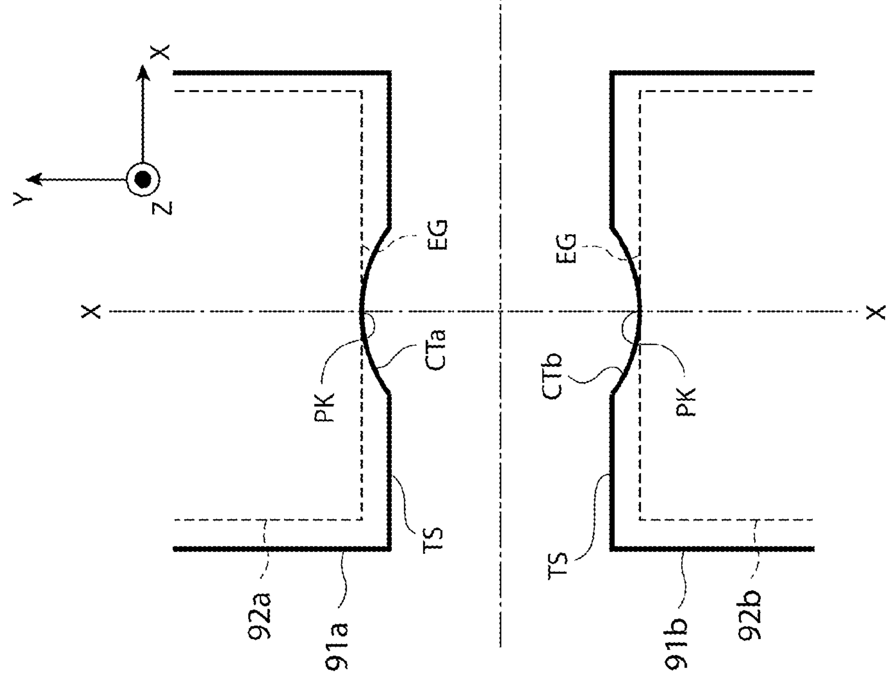

FIGS. 6A and 6B each show an appearance of the light blocking modules 82*a* and 82*b* seen from the second lens array 32 side when values of the turning angle α shown in FIG. 5 differ. Specifically, FIG. 6A shows an appearance when the value of the turning angle α is comparatively large, and the edges EG of the second light-blocking members 92*a* and 92*b* are in contact with peak portions PK of the cutout portions CTa and CTb. That is, the peak portions PK and edges EG are positioned at the same height in the Y direction. In this case, or in a case in which the value of the turning angle α is larger than this, the second light-blocking members 92*a* and 92*b* essentially have no effect, and a light blocking equivalent to carrying out the light blocking with only the first light-blocking members 91*a* and 91*b*, without providing the second light-blocking members 92*a* and 92*b*, is performed. As opposed to this, FIG. 6B shows an appearance when the value of the turning angle α is smaller than in FIG. 6A. In this case, the cutout portions CTa and CTb assume a condition in which they are partially occluded from the optical path upstream side by the second light-blocking members 92*a* and 92*b*, and the amount of blocking off of the illumination light is larger, by the occluded amount, than in the case of not providing the second light-blocking members 92*a* and 92*b*.

As already described, each edge EG extends linearly in the direction of extension of the edges TS. Because of this, as the shape of an area, formed by the cutout portions CTa and CTb and edges EG, allowing light through is maintained in a condition in which it is long in the X direction, as in FIG. 6B, it is possible to keep the illuminance distribution of the emitted luminous flux of illumination light comparatively uniform, and carry out a light reduction.

Figure 7:
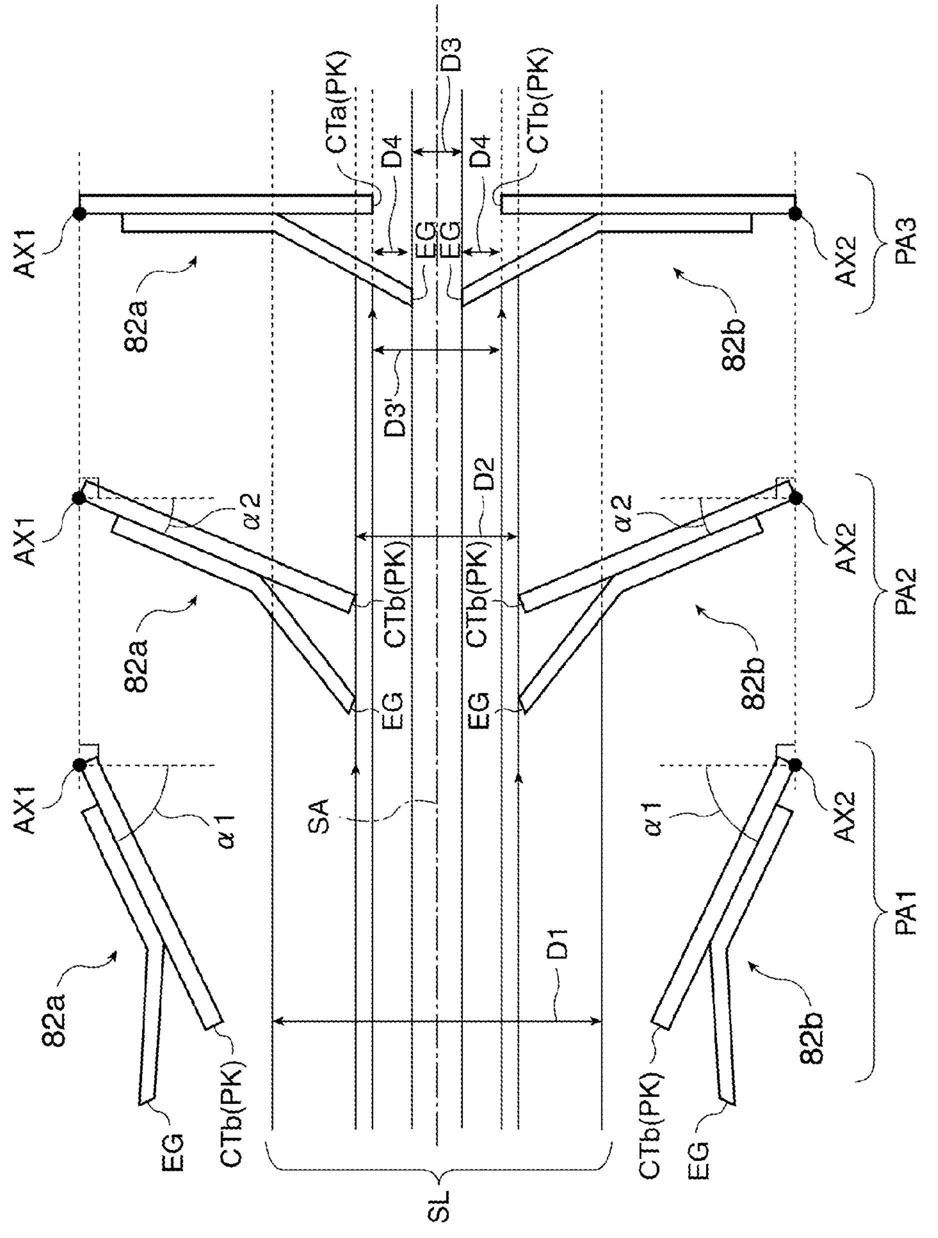
FIG. 7 is a diagram for describing a changing of an amount of blocked light by the light blocking members.

FIG. 7 is a schematic diagram for giving a detailed description of the heretofore described light blocking effect had by the second light-blocking members 92*a* and 92*b* on the cutout portions CTa and CTb during the opening and closing operation of the pair of light blocking modules 82*a* and 82*b*. The pair of light blocking modules 82*a* and 82*b* of FIG. 7 are shown in a condition in which they are cut along a plane (a cross-section taken along the line X-X of FIG. 6A) passing through the peak portions PK of the cutout portions CTa and CTb. Herein, a maximum area of an illumination light SL is represented by an area D1 as shown in FIG. 7. The light blocking modules 82*a* and 82*b* cause the blocked off area of the luminous flux of the illumination light SL to change by turning as in patterns PA1 to PA3, as a result of which, a dimming of the illumination light SL is carried out.

In the case of the pattern PA1, a value of a turning angle α1 is comparatively large, and the light blocking modules 82*a* and 82*b* do not exist in the maximum area D1 of the illumination light SL. Consequently, in this case, all elements of the illumination light SL pass through, and are utilized as the illumination light. In the case of the pattern PA2, a value of a turning angle α2 is smaller than the value of the turning angle α1, and one portion of light is blocked by the light blocking modules 82*a* and 82*b*. For this reason, only the light in an area D2 can pass through, and be utilized as the illumination light. Herein, the light blocking modules 82*a* and 82*b* of the pattern PA2 correspond to the condition of FIG. 6A. That is, lines joining the peak portions PK and edges EG in FIG. 7 are parallel to the system optical axis SA. In the case of the pattern PA3, the value of the turning angle is zero, that is, the area of the illumination light SL blocked off by the light blocking modules 82*a* and 82*b* is at a maximum. In this case, only the light in an area D3 between the edges EG of the second light-blocking members 92*a* and 92*b* can pass through, and be utilized as the illumination light. At this time, an area blocked off by the second light-blocking members 92*a* and 92*b* is also at a maximum.

As heretofore described, from the condition of the pattern PA1 to the condition of the pattern PA2 (when the value of the turning angle is between α1 and α2), it does not happen that the edges EG of the second light-blocking members 92*a* and 92*b* are positioned nearer to the system optical axis SA than the peak portions PK of the first light-blocking members 91*a* and 91*b*. Consequently, it is essentially no different to the blocking off of the illumination light SL being carried out only by the first light-blocking members 91*a* and 91*b*. Meanwhile, from the condition of the pattern PA2 to the condition of the pattern PA3 (when the value of the turning angle is between α2 and zero), the edges EG of the second light-blocking members 92*a* and 92*b* are positioned on a side nearer to the system optical axis SA than the peak portions PK. For this reason, a blocking off of light by the second light-blocking members 92*a* and 92*b*, in addition to the first light-blocking members 91*a* and 91*b*, is carried out. Consequently, in a range in which the value of the turning angle is smaller than the angle α2, the amount of light blocked off increases. Provisionally, in a case in which the blocking off is carried out with only the first light-blocking members 91*a* and 91*b*, without providing the second light-blocking members 92*a* and 92*b*, the light blocking area is defined by the cutout portions CTa and CTb, meaning that it is an area D3' that the illumination light SL can pass through at a time of maximum light blocking. As opposed to this, in the embodiment, by including the second light-blocking members 92*a* and 92*b*, it is possible, when fully closed, to narrow the area D3' by the amounts shown by areas D4 in the drawing, which are elements of the illumination light SL corresponding to the cutout portions CTa and CTb. By this means, it is possible, at a time of a maximum light blocking rate, to sufficiently lower the amount of illumination light. The second light-blocking members 92*a* and 92*b* not being involved in the blocking off of the luminous flux when the first light-blocking members 91*a* and 91*b* are fully open, the amount of illumination light is maintained. As heretofore described, the light control device 80 of the embodiment is of a configuration which includes a first stage of light blocking by only the first light-blocking members 91*a* and 91*b*, and a second stage of light blocking in which the second light-blocking members 92*a* and 92*b* are added to the light blocking by the first light-blocking members 91*a* and 91*b*. Because of this, a gentle light reduction is possible with the first stage of light blocking, and a large light reduction is possible with the second stage of light blocking.

Figure 8:
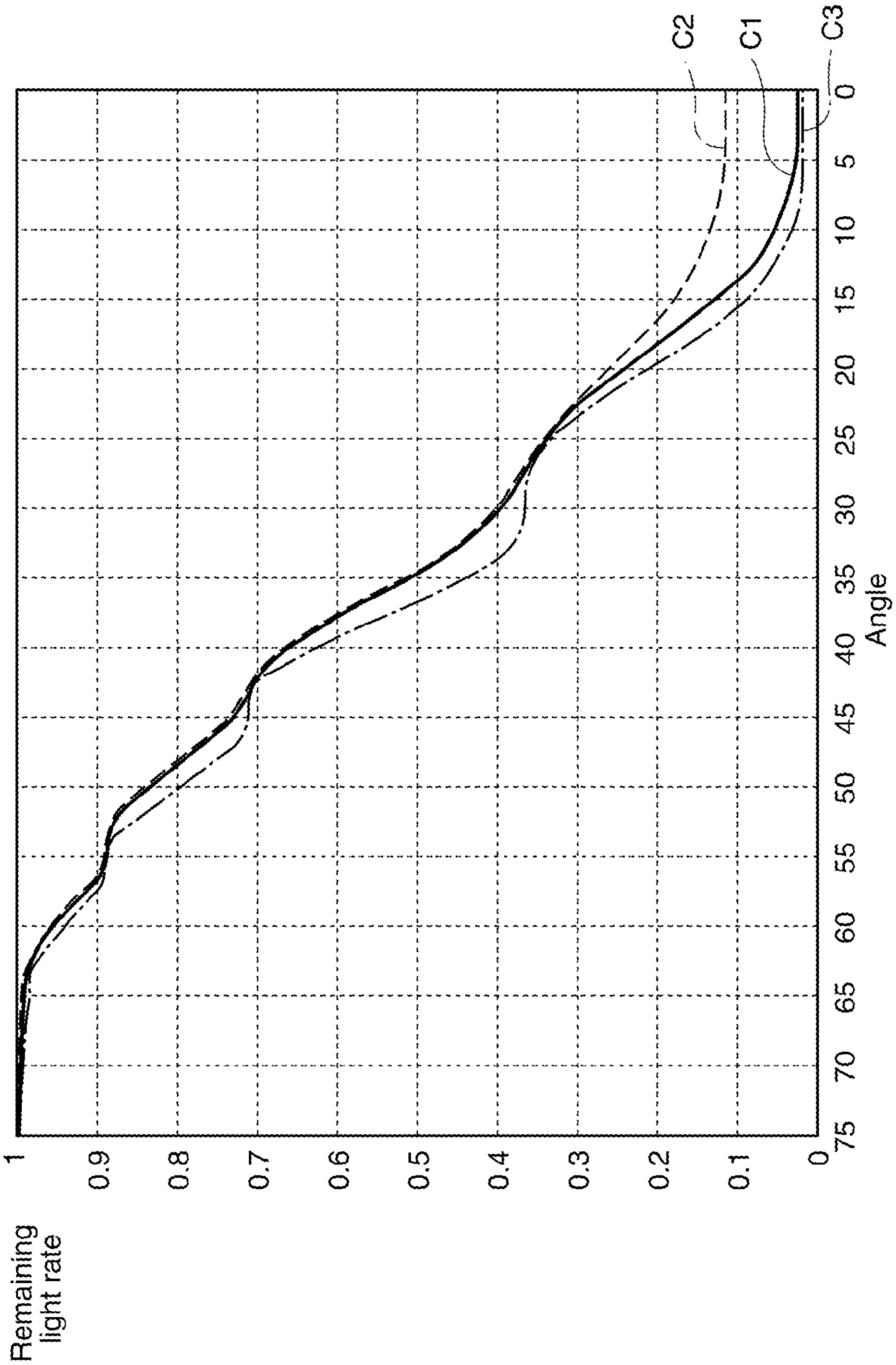
FIG. 8 is a graph comparing a tilting angle of the light blocking members and a remaining light rate.

FIG. 8, being a graph showing a relationship between the turning angle and a remaining light rate, that is, a ratio of light passing through the light control device 80, shows an example of the embodiment and comparative examples. Of the curves shown in the graph, a curve C1 is the example of the embodiment, a curve C2 is a comparative example of a case in which the cutout portions CTa and CTb are used, but the second light-blocking members 92*a* and 92*b* are not used, and a curve C3 is a comparative example of a case in which neither the cutout portions CTa and CTb nor the second light-blocking members 92_a_ and 92_b_ are used. With the curve C2, as there are no second light-blocking members 92_a_ and 92_b_, the remaining light rate is high when the turning angle is small, while with the curve C3, as there are no cutout portions CTa and CTb, it is difficult to obtain a gentle light reduction when the turning angle is large.

As opposed to this, with the example of the embodiment, as shown in the curve C1, in the first stage of light blocking, in which the turning angle is comparatively large, the change in the amount of blocked light is comparatively gentle, in the same way as in the case of the curve C2, and in the second stage of light blocking, in which the turning angle is comparatively small, the curve C1 approaches the curve C3, and it can be understood that a sufficient lowering of the amount of light is achieved at the time of the maximum light blocking rate. That is, the curve C1 is such that, by the cutout portions CTa and CTb functioning in the same way as in the case shown in the curve C2 when the value of the turning angle is comparatively large, the change in the amount of blocked light is comparatively gentle. Meanwhile, on the value of the turning angle becoming a certain value or lower (around 25 degrees in FIG. 8), by the second light-blocking members 92_a_ and 92_b_ having an effect on the cutout portions CTa and CTb, as already described, the amount of blocked light increases. Because of this, in the range in which the value of the turning angle is small, the curve C1 approaches the condition of the curve C3 in which there are no cutout portions CTa and CTb.

As heretofore described, the light control device 80 according to the embodiment carries out an adjustment of the amount of blocked light with the opening and closing operation of the pair of light blocking modules 82_a_ and 82_b_, at which time, due to the cutout portions CTa and CTb formed in the end portions of the first light-blocking members 91_a_ and 91_b_, a comparatively gentle change in the amount of blocked light is possible. Furthermore, the light blocking modules 82_a_ and 82_b_, with the second light-blocking members 92_a_ and 92_b_ disposed in proximity to the cutout portions CTa and CTb, change the area of blocked off light corresponding to the cutout portions CTa and CTb, and in particular, maximize the amount of blocked off luminous flux corresponding to the area of the cutout portions CTa and CTb when the first light-blocking members 91_a_ and 91_b_ are fully closed. By this means, it is possible to sufficiently lower the amount of light at the time of the maximum light blocking rate. Also, with the heretofore described light control device 80, it is also possible to configure the pair of light blocking modules 82_a_ and 82_b_ by, for example, having heretofore known plate-like light blocking members with a cutout portion as the first light-blocking members 91_a_ and 91_b_, and appending thereto the heretofore described second light-blocking members 92_a_ and 92_b_. Consequently, the manufacture of the light control device 80 which accomplishes the heretofore described advantage is a simple structure in comparison with the manufacture of, for example, a block-like light blocking body with a complex curved surface, or four light blocking plates which move in synchronization from four directions. Also, by using the illumination device 10 including the heretofore described kind of light control device 80 in the projector 100, it is also possible to make a light reduction curve for an image formation in the projector 100 of a gentle condition.

Second Embodiment

Figure 9:
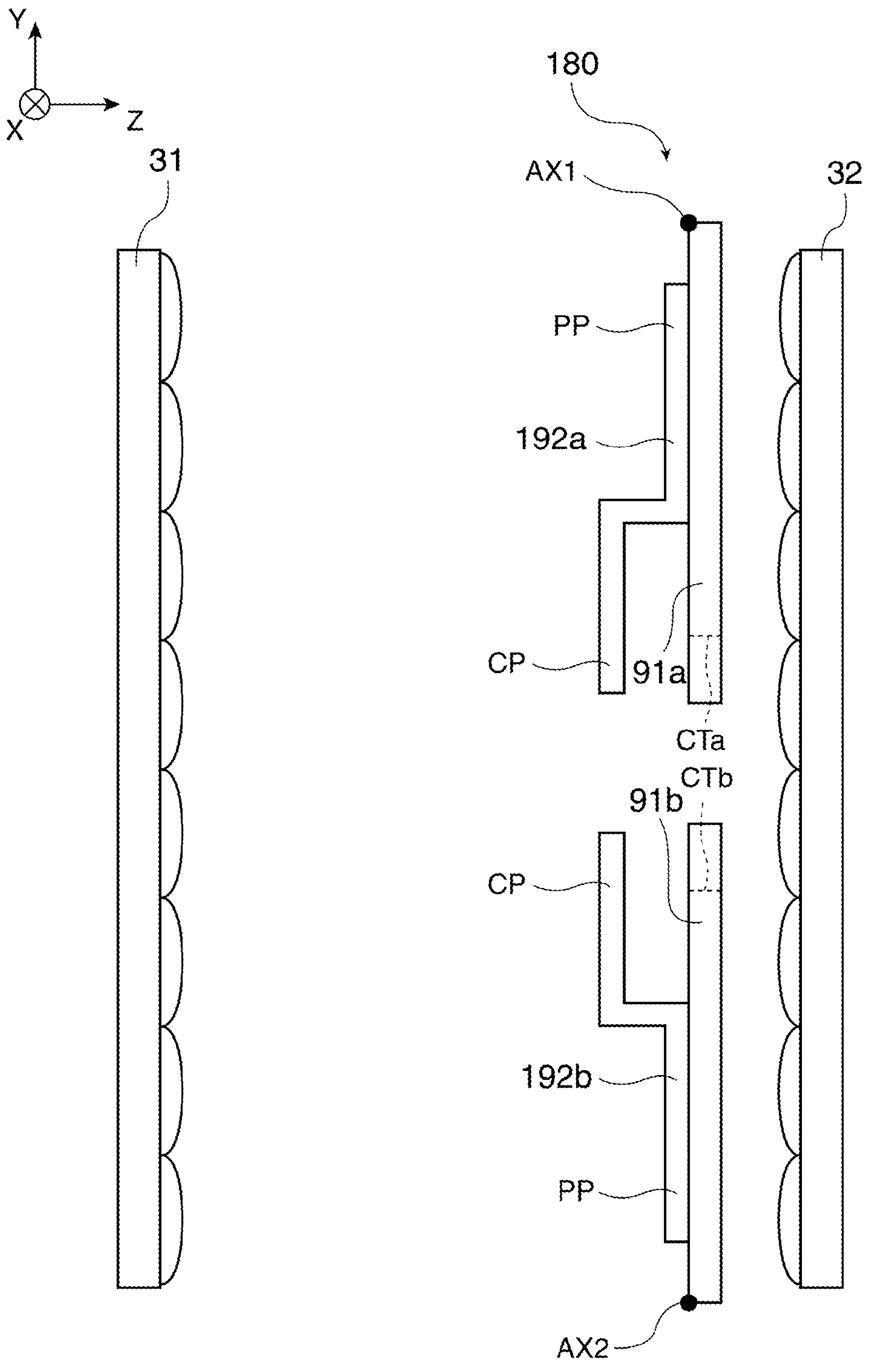
FIG. 9 is a diagram showing a light control device according to a second embodiment.

Hereafter, referring to FIG. 9, a description will be given of a light control device according to a second embodiment of the disclosure. As a light control device 180 according to the embodiment, being a modification example of the light control device 80 shown in, for example, FIG. 5, is the same as the light control device 80 except for the shape of second light-blocking members 192_a_ and 192_b_, only a disposition in the illumination device corresponding to FIG. 5 is shown in the drawing, while a description and depiction of a structure of the light control device 180, and its installation in the illumination device and projector, are omitted.

The light control device 180 of the embodiment includes the second light-blocking members 192_a_ and 192_b_. Although the second light-blocking members 192_a_ and 192_b_ are in a condition in which they are affixed to, and integrated with, the first light-blocking members 91_a_ and 91_b_, in the same way as the second light-blocking members 92_a_ and 92_b_ of the light control device 80, their shape is a stepped one. In the second light-blocking members 192_a_ and 192_b_ too, the end portions CP of the stepped portions are formed in such a way as to cover the cutout portions CTa and CTb of the first light-blocking members 91_a_ and 91_b_. Because of this, it being possible to increase the amount of blocked light when the value of the turning angle is a certain value or lower, it is possible to sufficiently lower the amount of light at the time of the maximum light blocking rate.

The disclosure, not being limited to the heretofore described embodiments, can be implemented in various forms without departing from the scope thereof; for example, the following modifications are also possible.

For example, in the first embodiment, the light control device 80 is a type in which the pair of light blocking modules 82_a_ and 82_b_ open and close like double doors, but it may also be one in which one light blocking plate is turned.

Also, with regard to the second light blocking members, not being limited to the heretofore described shapes, provided that it is possible to sufficiently lower the amount of light at the time of the maximum light blocking rate by covering the cutout portions CTa and CTb, various shapes and appearances are possible; for example, the second light blocking members may also occlude the cutout portions CTa and CTb by means of a slide mechanism. Also, in the first embodiment, the blocking off of the cutout portions CTa and CTb with the second light-blocking members 92_a_ and 92_b_ starts when the turning angle is $\alpha$2, but it is possible to appropriately adjust the border BR and angle $\theta$ of the second light-blocking members 92_a_ and 92_b_. That is, by changing the value of the turning angle $\alpha$2, it is possible to change the degree of effect on the amount of illumination light blocked off with the second light-blocking members 92_a_ and 92_b_. By this means, it is possible to arrange an appropriate condition of the amount of illumination light blocked off in accordance with the shape, disposition, and the like, of the first and second lens arrays 31 and 32. For example, in FIG. 5, in the case of blocking off with the light control device 80, it is possible to adopt a form wherein the blocking off with the second light-blocking members 92_a_ and 92_b_ is started when the blocking off of the illumination light corresponding to four rows' worth (two rows each at the top and bottom in the drawing) of element lenses on the outer sides of the first and second lens arrays 31 and 32 is completed, and only one portion of the illumination light corresponding to two rows' worth of element lenses on the central sides is allowed to pass through when the second light-blocking members 92_a_ and 92_b_ are fully closed.

Also, in the heretofore described embodiments, a high pressure mercury-vapor lamp is used as the lamp main body 22_a_ used in the light source lamp unit 21, but a metal halide lamp may also be used.

Also, in the heretofore described embodiments, the polarization converting member 34 which makes the light from the light source lamp unit 21, and the like, polarized light of a specific direction is used, but the disclosure can also be applied to an illumination device which does not use this kind of polarization converting member 34.

Also, in the heretofore described embodiments, a description is given of an example of a case in which the disclosure is applied to a projector including the transmissive liquid crystal light bulbs 50*a*, 50*b*, and 50*c*, but the disclosure can also be applied to a projector including reflective liquid crystal light bulbs. Herein, "transmissive" means that the liquid crystal light bulbs are of a type which transmits light, while "reflective" means that the liquid crystal light bulbs are of a type which reflects light.

Also, as projectors, there are a front projection type of projector, which carries out an image projection from a direction from which a projection surface is viewed, and a rear projection type of projector, which carries out an image projection from a side opposite to the direction from which the projection surface is viewed, but the configuration of the projector shown in FIG. 1, and the like, can be applied to either of them.

Also, in the heretofore described embodiments, the modulation of each colored light is carried out using the color separation/light guiding optical system 40, liquid crystal light bulbs 50*a*, 50*b*, and 50*c*, and the like, but by using, instead of these, for example, a combination of a color wheel illuminated by the illumination device, and a device (a light modulating module), configured of micromirror pixels, which is irradiated with light transmitted through the color wheel, it is also possible to carry out a colored light modulation and synthesis. Therefore, it is manifestly intended that embodiments in accordance with the present disclosure be limited only by the claims and the equivalents thereof.

What is claimed is:

1. A light control device, comprising:

a light blocking module to block a luminous flux passing through the light control device in a luminous flux direction parallel to a system optical axis, the light blocking module including a turning axis module to perform an opening operation and a closing operation of the light blocking module around a turning axis, a plate-like first light blocking member having a cutout portion at an end near the system optical axis to permit some of the luminous flux to pass through the first light blocking member, the first light blocking member configured to change a size of an area blocking the luminous flux in accordance with the opening and closing operations of the light blocking module, and a second light blocking member disposed in proximity to the first light blocking member and configured to increasingly block the luminous flux from passing through the cutout portion of the first light blocking member in accordance with progression of the closing operation of the light blocking module, such that at least a portion of the luminous flux is blocked by the second light blocking member from passing through the cutout portion when the light blocking module is fully closed; and a turning mechanism to cause the turning axis module of the light blocking module to turn, wherein:

the first light blocking member is fixed to the second light blocking member such that the first light blocking member moves in conjunction with the second light blocking member during the opening and closing operations of the light blocking module, and an end of the second light blocking member nearest the system optical axis is separated from the first light blocking member in a direction opposite the luminous flux direction when the light blocking module is fully closed.

2. The light control device according to claim 1, wherein the second light blocking member does not block the luminous flux from passing through the cutout portion of the first light blocking member when the light blocking module is fully open and the luminous flux blocked from passing through the cutout portion is maximized when the light blocking module is fully closed.

3. The light control device according to claim 1, wherein the second light blocking member is integrally attached to the first light blocking member.

4. The light control device according to claim 1, wherein the second light blocking member is configured of a plate-like member with an end portion near the system optical axis and is bent in a direction away from the cutout portion of the first light blocking member.

5. The light control device according to claim 1, wherein an edge of the end of the first light blocking member, including the cutout portion, and an edge of an end portion of the second light blocking member, are configured to gradually move away from the turning axis at a predetermined angle.

6. The light control device according to claim 1, wherein an edge of an end portion of the second light blocking member is parallel to an edge of the end of the first light blocking member.

7. The light control device according to claim 3, further comprising another light blocking module having a first light blocking member integrally attached to a second light blocking member, the pair of light blocking modules symmetrically disposed with the system optical axis as a central axis, wherein the turning mechanism drives the pair of light blocking modules in synchronization with each other.

8. An illumination device for a projector, comprising:

the light control device according to claim 1; and a pair of fly-eye lenses for homogenizing a light from a light source and forming an illumination light, the light control device being disposed between the pair of fly-eye lenses.

9. A projector, comprising:

a system optical axis;

a light source lamp unit that emits a luminous flux, an optical axis of the luminous flux is the system optical axis;

a light control device that adjusts an amount of light of the luminous flux by partially blocking off the light, the light control device including, a light blocking module to block a luminous flux passing through the light control device in a luminous flux direction parallel to the system optical axis, the light blocking module including a turning axis module to perform an opening operation and a closing operation of the light blocking module around a turning axis, a plate-like first light blocking member having a cutout portion at an end near the system optical axis to permit some of the luminous flux to pass through the first light blocking member, the first light blocking member configured to change a size of an area blocking the luminous flux in accordance with the opening and closing operations of the light blocking module, and a second light blocking member disposed in proximity to the first light blocking member and configured to increasingly block the luminous flux from passing through the cutout portion of the first light blocking member in accordance with progression of the closing operation of the light blocking module, such that at least a portion of the luminous flux is blocked by the second light blocking member from passing through the cutout portion when the light blocking module is fully closed; and a turning mechanism to cause the turning axis module of the light blocking module to turn;

a light modulating module that modulates the luminous flux adjusted the amount of light by the light control device in accordance with a drive signal; and a projection optical system that projects modulated light by the light modulating module, wherein:

the first light blocking member is fixed to the second light blocking member such that the first light blocking member moves in conjunction with the second light blocking member during the opening and closing operations of the light blocking module, and an end of the second light blocking member nearest the system optical axis is separated from the first light blocking member in a direction opposite the luminous flux direction when the light blocking module is fully closed.

10. The projector according to claim 9, wherein the second light blocking member does not block the luminous flux from passing through the cutout portion of the first light blocking member when the light blocking module is fully open and the luminous flux blocked from passing through the cutout portion is maximized when the light blocking module is fully closed.

11. The projector according to claim 9, wherein the second light blocking member is integrally attached to the first light blocking member.

12. The projector according to claim 9, wherein the second light blocking member is configured of a plate-like member with an end portion near the system optical axis and is bent in a direction away from the cutout portion of the first light blocking member.

13. The projector according to claim 9, wherein an edge of the end of the first light blocking member, including the cutout portion, and an edge of an end portion of the second light blocking member, are configured to gradually move away from the turning axis at a predetermined angle.

14. The projector according to claim 9, wherein an edge of an end portion of the second light blocking member is parallel to an edge of the end of the first light blocking member.

15. The projector according to claim 11, further comprising another light blocking module having a first light blocking member integrally attached to a second light blocking member, the pair of light blocking modules symmetrically disposed with the system optical axis as a central axis, wherein the turning mechanism drives the pair of light blocking modules in synchronization with each other.

16. The projector according to claim 9, further comprising:

a pair of fly-eye lenses for homogenizing a light from a light source and forming an illumination light, the light control device being disposed between the pair of fly-eye lenses.

* * * * *